(12) United States Patent
Ohta

(10) Patent No.: US 6,307,644 B1
(45) Date of Patent: Oct. 23, 2001

(54) IMAGE PROCESSING METHOD AND APPARATUS AND RECORDING MEDIUM

(75) Inventor: Takatoshi Ohta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/122,332

(22) Filed: Jul. 24, 1998

(30) Foreign Application Priority Data

Jul. 25, 1997 (JP) .................................................. 9-200123

(51) Int. Cl.[7] ............................. B41B 15/00; H04N 1/46; G03F 3/08
(52) U.S. Cl. .......................... 358/1.9; 358/1.11; 358/515; 358/518; 358/520; 358/525; 358/519; 382/276
(58) Field of Search .................................... 358/515, 428, 358/501, 518, 519, 520, 1.9, 1.11, 525; 382/276; 348/45

(56) References Cited

U.S. PATENT DOCUMENTS

| | | | |
|---|---|---|---|
| 5,311,332 | 5/1994 | Imao et al. | 358/518 |
| 5,315,415 | 5/1994 | Kawai et al. | 358/515 |
| 5,768,410 | 6/1998 | Ohta et al. | 382/162 |

FOREIGN PATENT DOCUMENTS

| | | | | |
|---|---|---|---|---|
| 0168818 | * | 1/1986 | (EP) | H04N/1/46 |
| 0551773 | * | 1/1986 | (EP) | H04N/1/46 |
| 0551773 | | 7/1993 | (EP) | H04N/1/46 |
| 5046750 | | 2/1993 | (JP) | G06F/15/66 |
| 7193723 | | 7/1995 | (JP) | H04N/1/60 |
| 8237497 | | 9/1996 | (JP) | H04N/1/60 |

\* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

An image processor converts an input signal into first and second color components and a component. A plurality of output device dependent color-component data is read from a look-up table on the basis of the first and second color components and the brightness component. Interpolation processing is performed on the basis of the read plurality of color component data to generate output device dependent color-component data corresponding to the input signal.

10 Claims, 16 Drawing Sheets

| FIG. 1A | FIG. 1B |

FIG. 5

| CONDITIONS | OUTPUT 1 (C1) | OUTPUT 2 (C2) | OUTPUT 3 (L) | OUTPUT 4 |
|---|---|---|---|---|
| $C_{in} == M_{in} == Y_{in}$ | 0 | 0 | $C_{in}$ (or $M_{in}$ or $Y_{in}$) | 000 |
| $Y_{in} > C_{in}$, $M_{in} <= Y_{in}$, $C_{in} <= M_{in}$ | $M_{in} - C_{in}$ | $Y_{in} - M_{in}$ | $C_{in}$ | 001 |
| $Y_{in} <= C_{in}$, $M_{in} > Y_{in}$, $C_{in} <= M_{in}$ | $C_{in} - Y_{in}$ | $M_{in} - C_{in}$ | $Y_{in}$ | 010 |
| $Y_{in} > C_{in}$, $M_{in} > Y_{in}$, $C_{in} <= M_{in}$ | $M_{in} - Y_{in}$ | $Y_{in} - C_{in}$ | $C_{in}$ | 011 |
| $Y_{in} <= C_{in}$, $M_{in} <= Y_{in}$, $C_{in} > M_{in}$ | $Y_{in} - M_{in}$ | $C_{in} - Y_{in}$ | $M_{in}$ | 100 |
| $Y_{in} > C_{in}$, $M_{in} <= Y_{in}$, $C_{in} > M_{in}$ | $Y_{in} - C_{in}$ | $C_{in} - M_{in}$ | $M_{in}$ | 101 |
| $Y_{in} <= C_{in}$, $M_{in} > Y_{in}$, $C_{in} > M_{in}$ | $C_{in} - M_{in}$ | $M_{in} - Y_{in}$ | $Y_{in}$ | 110 |
| $Y_{in} > C_{in}$, $M_{in} > Y_{in}$, $C_{in} > M_{in}$ | — | — | — | — |

FIG. 11

| Y"<br>X" | 0 | 1 | 2 |
|---|---|---|---|
| 0 | (0,0),(1,0),(0,1) | (0,1),(1,1),(0,2) | (0,2),(1,2),(0,3) |
| 1 | (1,0),(2,0),(1,1) | (1,1),(2,1),(1,2) | (2,1),(1,1),(2,0) |
| 2 | (2,0),(3,0),(2,1) | (1,2),(0,2),(1,1) | (1,1),(0,1),(1,0) |

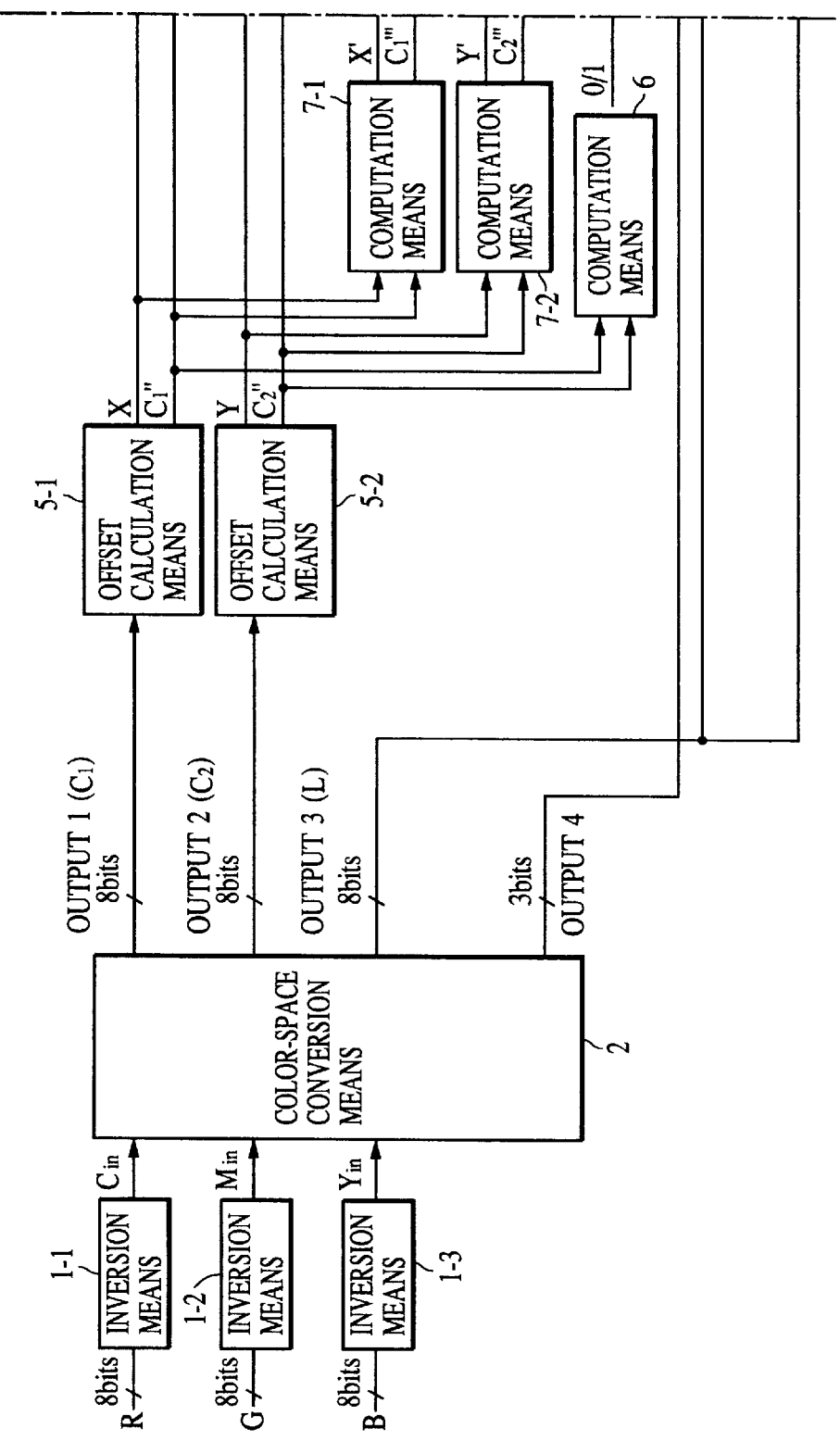

IMAGE PROCESSING METHOD AND APPARATUS AND RECORDING MEDIUM

BACKGROUND OF THE INVENTION

1. Field of the Invention

The present invention relates to an image processing method and an apparatus for performing color processing by using interpolation processing, and a recording medium.

2. Description of the Related Art

Hitherto, representative of this type of apparatus, a color correction processing apparatus is known, such as a color ink jet printer, for performing recording by causing ink to be deposited onto a surface. In such apparatuses, for example, it is necessary to provide an input signal in the form of luminance signals of R (red), G (green) and B (blue) which are dependent upon a device, and to obtain density signals corresponding to each of the colors C (cyan), M (magenta), Y (yellow) and K (black) as output signals. Also, by taking the portability of image data into consideration, in such a processing system a method has recently been proposed in which an input signal is once converted into a color space, which is not device dependent, such as the CIE 1931 XYZ color space or the CIE1976LAB color space, determined by the Commission Internationaldel Eclairage (abbreviated as CIE), and converted into a density signal dependent upon an output device. At this time, the color correction processing apparatus must perform many processes (the details of which are omitted here), as shown in FIG. 2.

Accordingly, a method is proposed in, for example, Laid-Open Japanese Patent Nos. 7-193723 and 8-237497, in which the results, such that this series of processing is performed in advance on a specific input signal, are stored in a N-dimensional look-up table (LUT), and an interpolation computation is performed by referring to the LUT, thereby obtaining an output signal corresponding to a desired input signal.

Since all of these methods take an orthogonal coordinate system of RGB and the like as an input signal and obtain an output signal by linear interpolation, there is the drawback of the interpolation accuracy being poor.

Meanwhile, in Laid-Open Japanese Patent No. 5-46750, a method is proposed in which an RGB input signal is converted into hue, chromaticity and brightness, and this is interpolation-computed by referring to a two-dimensional or three-dimensional LUT, thereby obtaining an output signal corresponding to a desired input signal. In these methods, the object is to increase the accuracy by converting an input signal into a signal appropriate for a visual characteristic. However, in the former case conversion into a polar coordinate system must be performed, and in the latter case conversion into a YCrCb coordinate system must be performed, giving rise to the drawback of the processing becoming heavily loaded.

Also, in Japanese Patent Publication No. 7-119128, as a method for converting an RGB input signal into hue, chromaticity and brightness, a method simplified by comparing the relationship of the RGB input signals is proposed. However, in these proposals, since many processes, such as those shown in FIG. 2, are not considered, there is the drawback that an interpolation computation using a LUT cannot be performed.

As described above, each of the conventional technologies has drawbacks such as the interpolation accuracy being poor, and the processing becoming heavily loaded.

SUMMARY OF THE INVENTION

An object of the present invention, which is achieved in view of the above-described points, is to perform image processing with enhanced accuracy without requiring complex processing.

To achieve the above-described object, according to one aspect of the present invention, there is provided an image processing method, including the steps of: converting an input signal into first and second color components and a component indicating brightness; referring to a look-up table on the basis of the first and second color components and the component indicating brightness, and reading a plurality of color-component data from the look-up table dependent upon an output device; and performing interpolation processing on the basis of the plurality of color-component data dependent upon an output device, and generating output device dependent color-component data corresponding to the input signal.

According to another aspect of the present invention, there is provided an image processing method, including the steps of: inputting an image signal formed of three components; generating a brightness component, and two color components on the basis of minimum data of the three components; referring to a look-up table on the basis of the brightness components and the two color components, and reading a plurality of color-component data from the look-up table dependent upon an output device; and performing interpolation processing by using the color-component data dependent upon the output device, and computing output device dependent color-component data corresponding to the image signal.

Other objects, features and advantages of the invention will become more apparent from the following detailed description given in conjunction with the accompanying drawings.

BRIEF DESCRIPTION OF THE DRAWINGS

FIG. 5 is a table showing a predetermined relationship between inputs $C_{in}$, $M_{in}$, and $Y_{in}$ and outputs 1 to 4 of the color space conversion means 2 of FIG. 1A.

FIG. 11 is a table showing the values of outputs X" and Y" of selection means 8, and the output.

FIGS. 12A and 12B when taken together as shown in FIG. 12 is a block diagram showing the construction of an image processing apparatus according to a second embodiment of the present invention.

DESCRIPTION OF THE PREFERRED EMBODIMENTS

[First Embodiment]

An embodiment of the present invention is described in detail below with reference to the accompanying drawings.

First, the interpolation method of this embodiment, which is performed at high speed, is described with reference to the figures.

Figure 3:
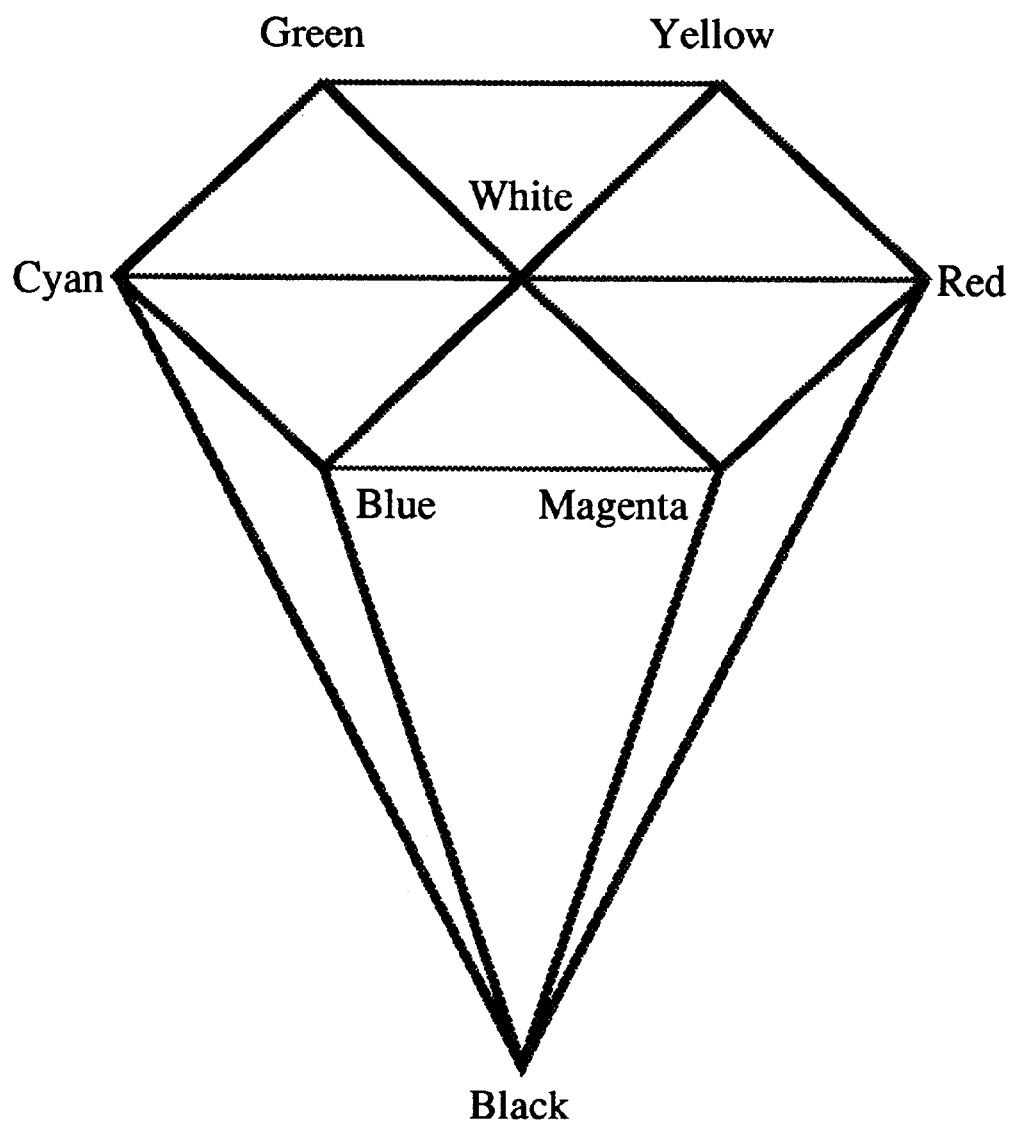
FIG. 3 is a schematic view showing a color space used in an interpolation method.
Figure 4A:
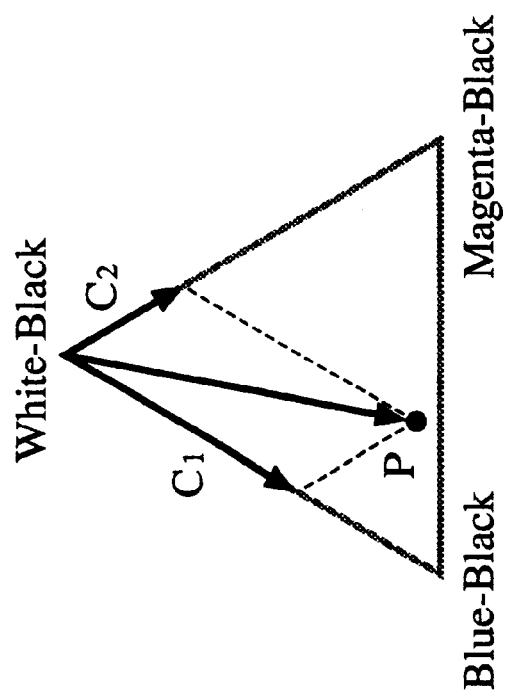
FIGS. 4A and 4B are schematic views illustrating an interpolation method.
Figure 4B:
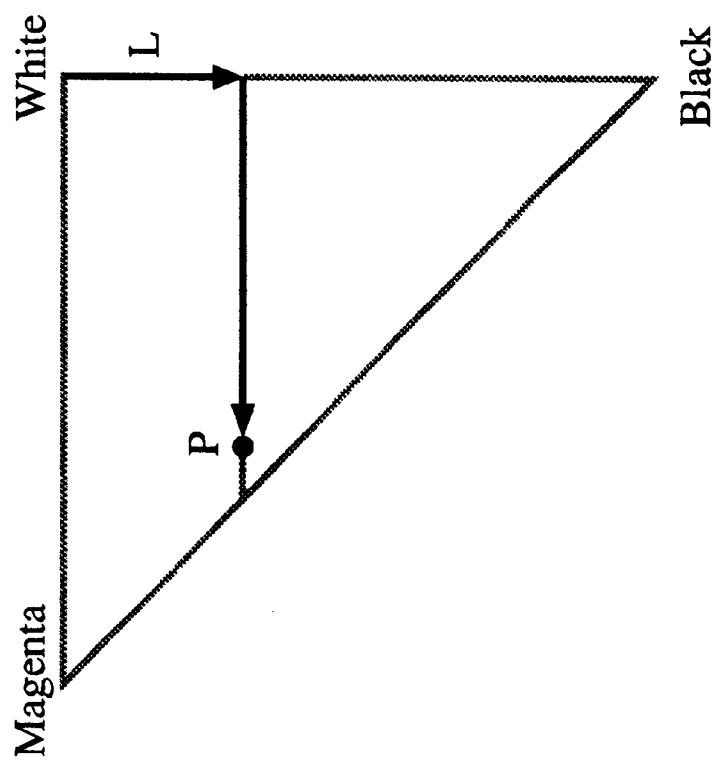

FIGS. 3, 4A and 4B are views illustrating a color space for use in this interpolation method. A hexagonal pyramid such as that shown in FIG. 3 is considered first. The six apexes of the hexagon on the top surface represent in sequence the primary colors used in the additive or subtractive process of Red, Yellow, Green, Cyan, Blue, and Magenta in sequence, and the middle point on the top surface represents White. Also, the apex of the lower point surface of the hexagonal pyramid represents Black. When such a space is considered, a specific color is uniquely represented by three values of a first color ($C_1$), a second color ($C_2$), and brightness (L) in a certain hue (an area represented by two adjacent colors of the above-described six colors).

If, for example, an input color P is in a hue between Blue and Magenta, P is present on a plane lower by L from White, as shown in FIG. 4A. Further, as shown in FIG. 4B, P is presented as a point (•) such that the vectors represented by $C_1$ and $C_2$ on the above-described plane are synthesized.

Next, a description is given of a method of constructing a look-up table and an interpolation processing method.

Figure 6:
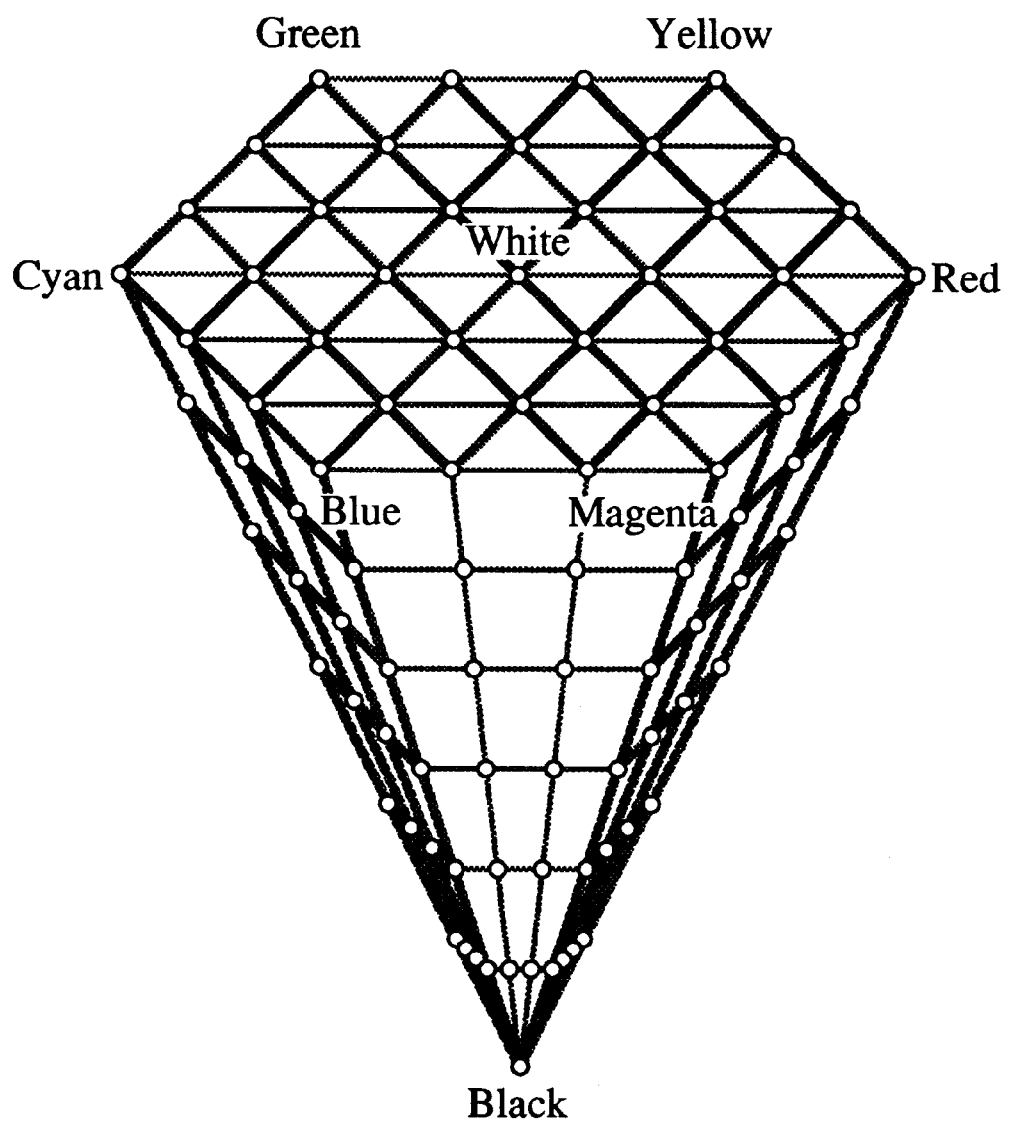
FIG. 6 is a first schematic view showing the structure of a LUT according to the first embodiment of the present invention.
Figure 7:
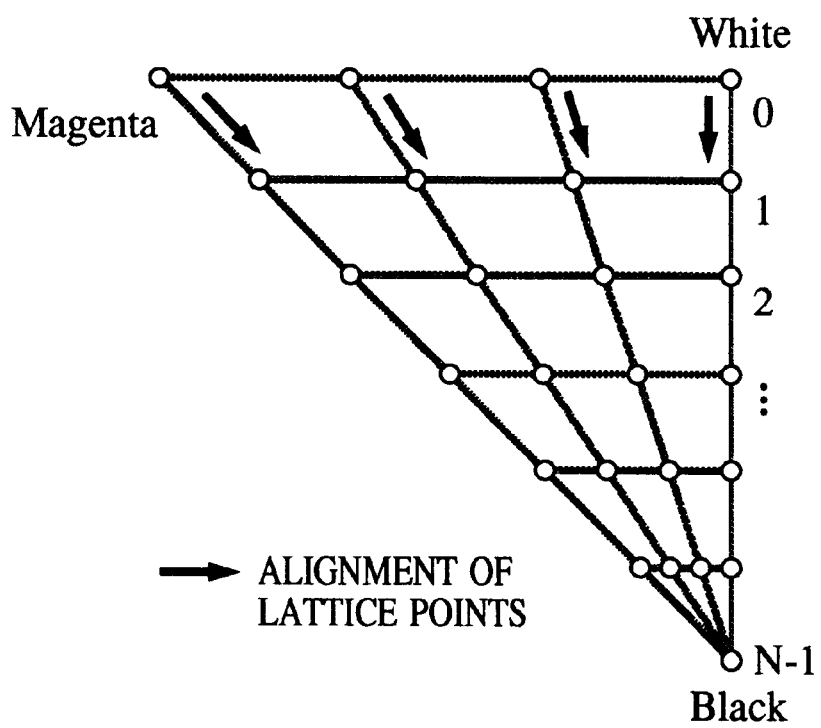
FIG. 7 is a second schematic view showing the structure of a LUT according to the first embodiment of the present invention.

FIGS. 6 and 7 show a method of constructing a look-up table according to this interpolation method. As shown in these figures, in this interpolation method, the construction is formed such that the hexagon on the top surface is divided into a plurality of regular triangles, and a plurality of straight lines which extend from each apex of these triangles to the Black (indicated by the arrows in FIG. 7) is made to have N lattice points. These lattice points are indicated by (○) in the figures.

The output value of the input color P is determined on the basis of these lattice points by an interpolation method described below.

Initially, the straight line which connects the input color P (indicated by • in FIG. 8) to Black is extended, and when the intersection with the hexagon on the top surface is denoted as P' (indicated by • in FIG. 8), the three points ($G_{00}$, $G_{10}$, and $G_{20}$) which surround P' are determined. As shown in FIG. 7, in this embodiment, since the lattice points are aligned on the straight line which goes from these three points to Black, if these three points and the value of the brightness L are determined, the six lattice points ($G_{0i}$, $G_{1i}$, $G_{2i}$, $G_{0i+1}$, $G_{1i+1}$, and $G_{2i+1}$) which surround the input color P are determined.

At this point, if the output values at the lattice points $G_{0i}$, $G_{1i}$, $G_{2i}$, $G_{0i+1}$, $G_{1i+1}$, and $G_{2i+1}$ are denoted as $O_{0i}$, $O_{1i}$, $O_{2i}$, $O_{0i+1}$, $O_{1i+1}$, and $O_{2i+1}$, respectively, and the intersections of the plane parallel to the hexagon on the top surface, containing the input color P, with the three straight lines which go from $G_{00}$, $G_{10}$, and $G_{20}$ to Black are denoted as $G_{0L}$, $G_{1L}$, and $G_{2L}$, respectively, the output values $O_{0L}$, $O_{1L}$, and $O_{2L}$ of $G_{0L}$, $G_{1L}$, and $G_{2L}$ are determined by the following equations:

$$O_{0L}=(O_{0i} \times (L_{i+1}-L)+O_{0i+1} \times (L-L_{i+1}))/(L_{i+1}-L_i))$$
$$O_{1L}=(O_{1i} \times (L_{i+1}-L)+O_{1i+1} \times (L-L_{i+1}))/(L_{i+1}-L_i))$$
$$O_{2L}=(O_{2i} \times (L_{i+1}-L)+O_{2i+1} \times (L-L_{i+1}))/(L_{i+1}-L_i)) \tag{1}$$

where $L_i$ represents the brightness of the lattice points $G_{0i}$, $G_{1i}$, and $G_{2i}$, and, similarly $L_{i+1}$ represents the brightness of the lattice points $G_{0i+1}$, $G_{1i+1}$, and $G_{2i+1}$.

Further, the output value O of the input color P is determined on the basis of the output values $O_{0L}$, $O_{1L}$, and $O_{2L}$ by the following equation:

$$O=(O_{0L} \times (SMAX-C_1-C_2)+O_{1L} \times C_1+O_{2L} \times C_2)/SMAX_L \tag{2}$$

where SMAX is a value representing the distance from the center to each apex in the hexagon on the top surface, and $SMAX_L$ is a value representing the distance from the center to each apex in the hexagonal surface having a brightness L.

At this point, if it is assumed that $C_1$, $C_2$, and L are each represented by 8 bits, the equations of the following are satisfied:

$$C_1=(255-L) \times C_1'/255$$
$$C_2=(255-L) \times C_2'/255$$
$$SMAX_L=255-L \tag{3}$$

By substituting equation (3) into equation (2), $$O=(O_{0L} \times (255-C_1'-C_2')+O_{1L} \times C_1'+O_{2L} \times C_2')/255 \tag{4}$$

Thus, the output value O in the input color P can be determined.

Next, with reference to the figures, a description is given of an embodiment in which the above-described interpolation process is applied to CMY-CMYK conversion.

Figures 1, 1A:
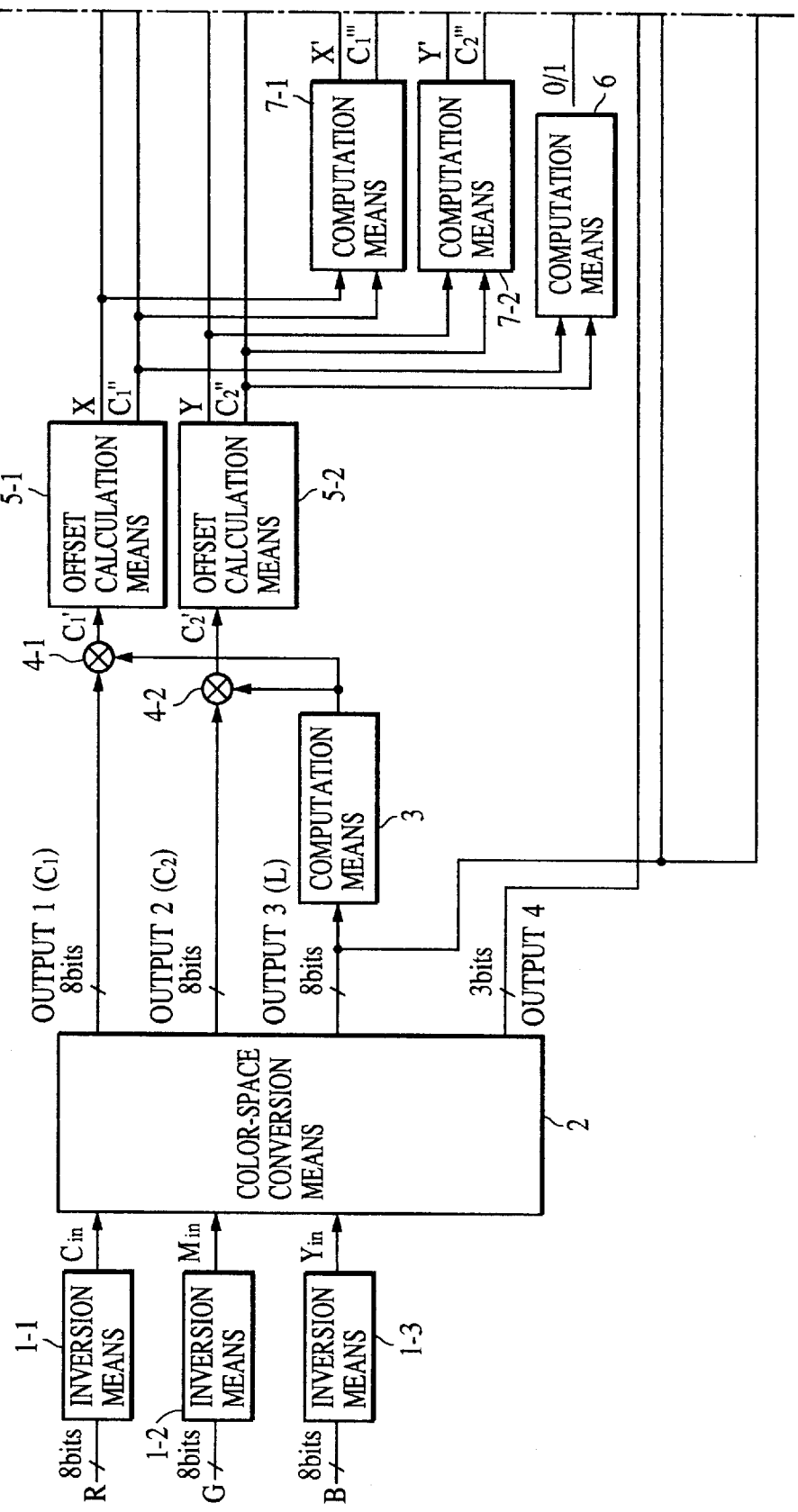
FIGS. 1A and 1B when taken together as shown in FIG. 1 is a block diagram showing the construction of an image processing apparatus according to a first embodiment of the present invention.
Figure 1B:
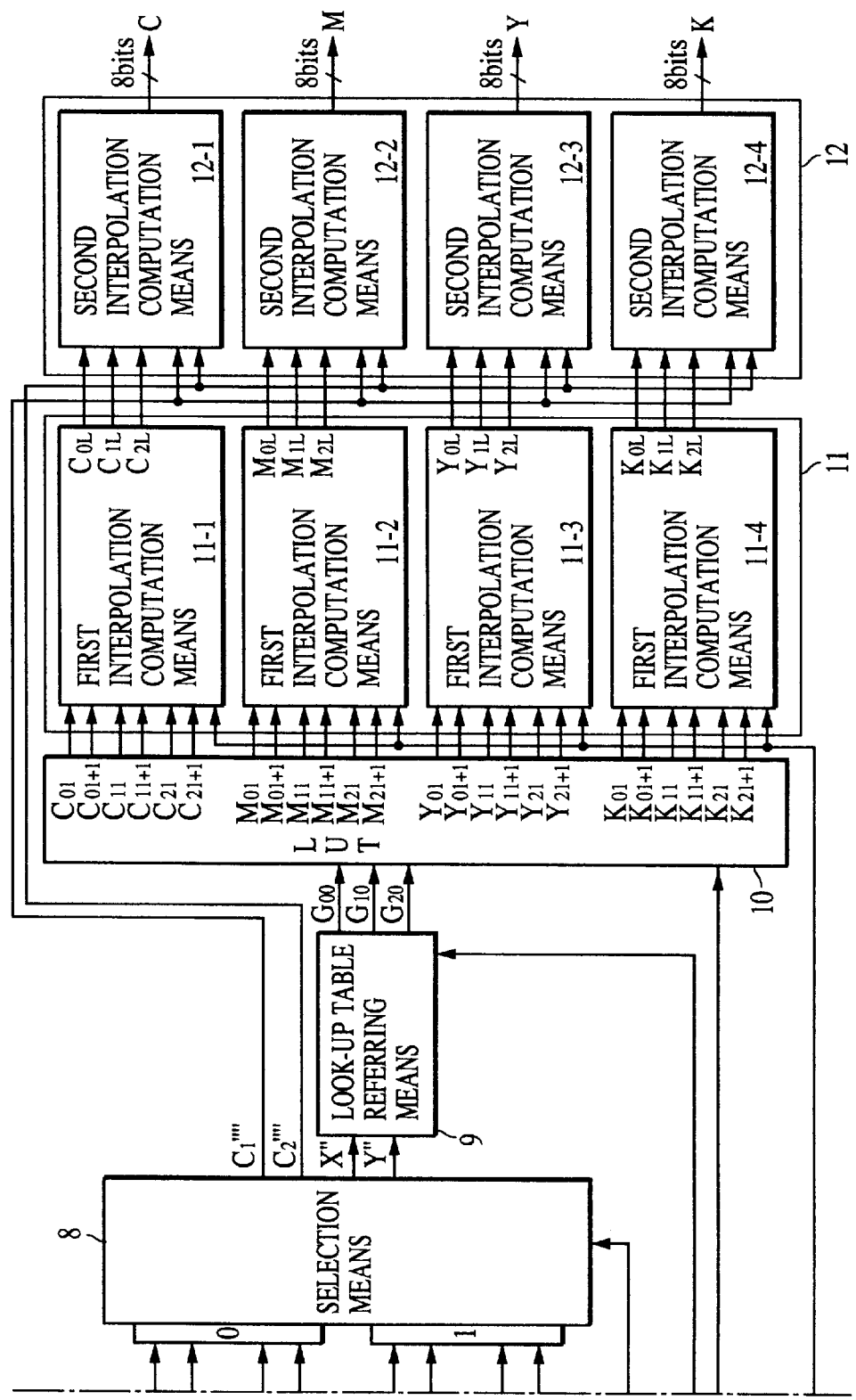
Figure 2:
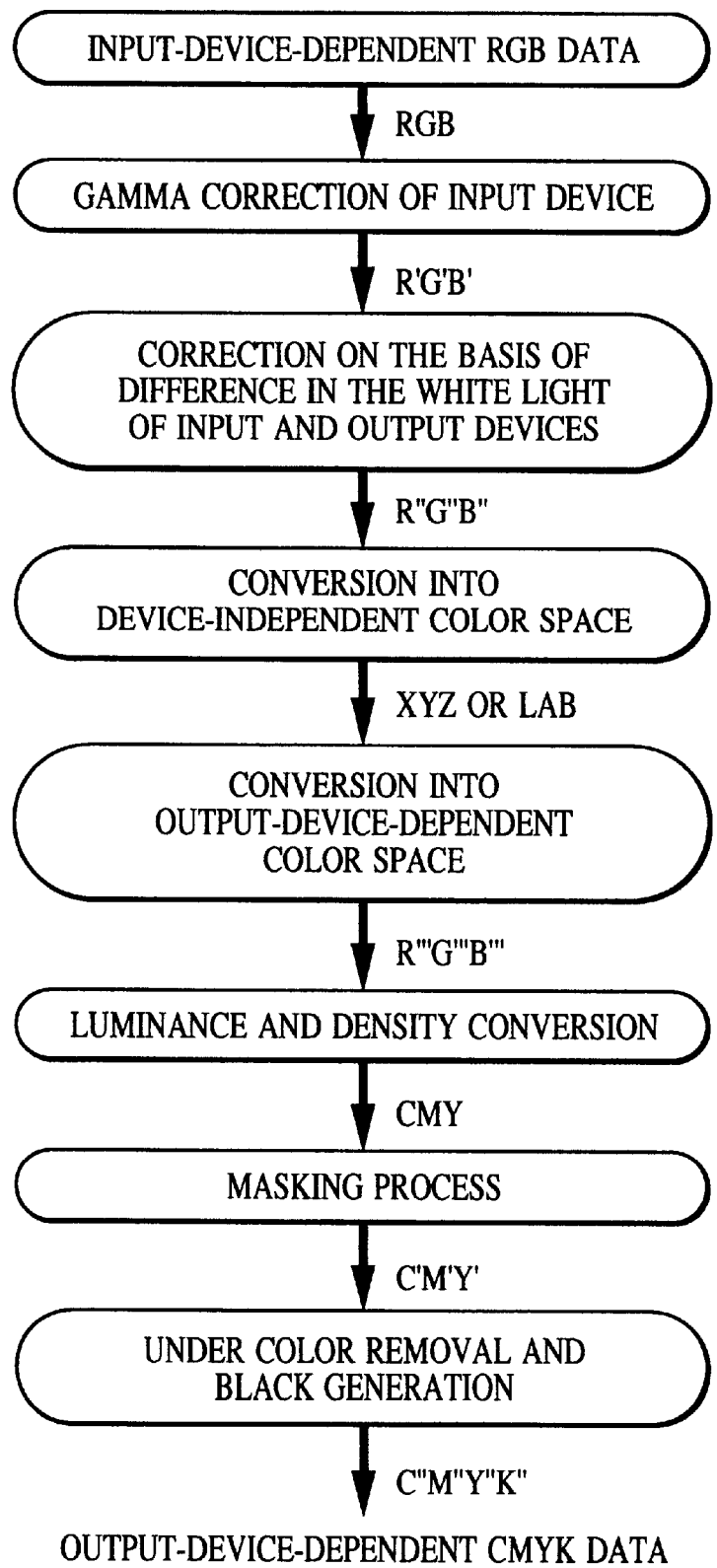
FIG. 2 is a flowchart showing the flow of color conversion processing.
Figure 8:
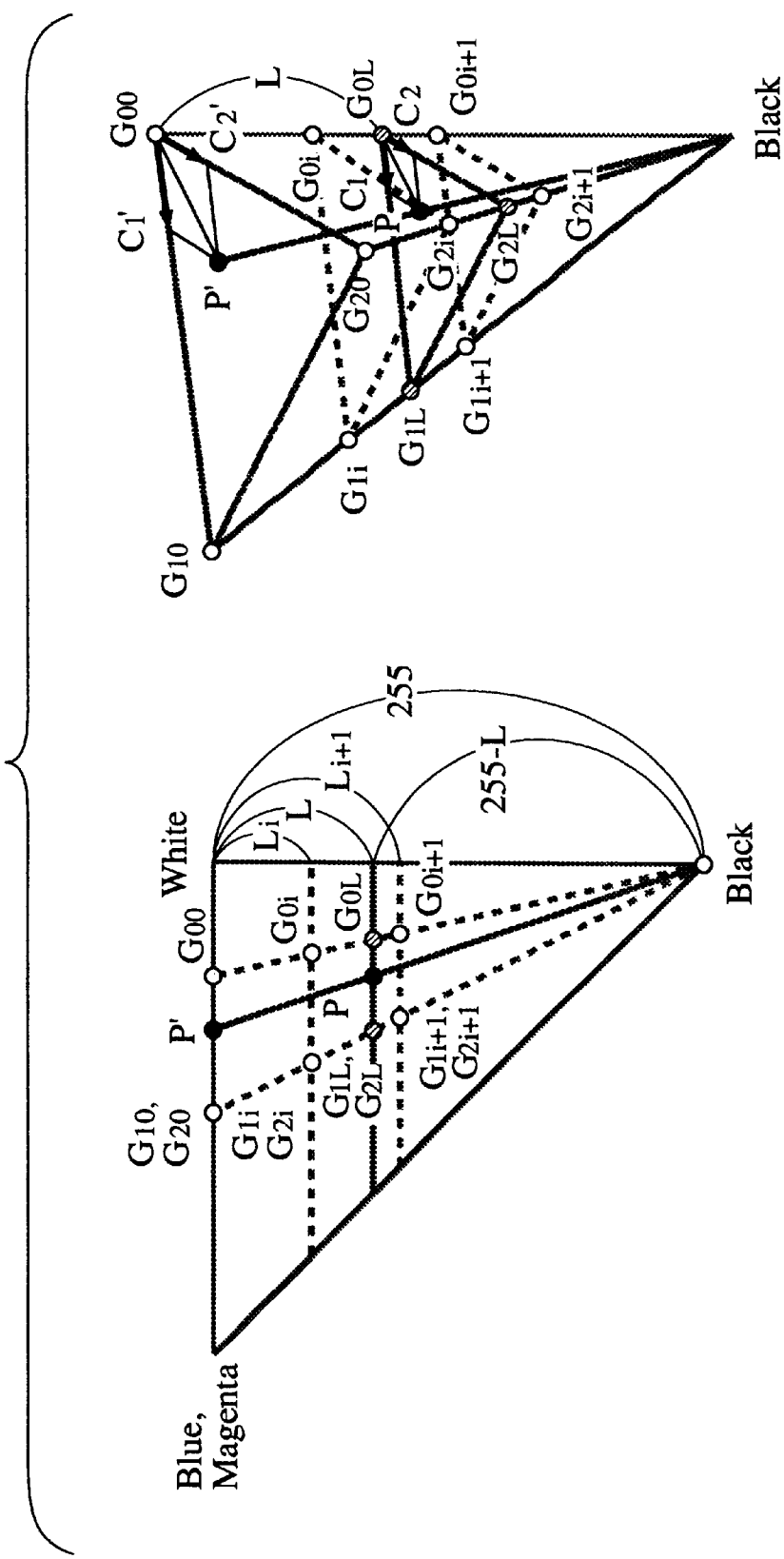
FIG. 8 is a schematic view showing an interpolation method of the first embodiment of the present invention.

FIGS. 1A and 1B when taken together as shown in FIG. 1 is a block diagram illustrating the construction of an image processing apparatus according to a first embodiment of the present invention. In FIG. 1A, 8-bit data for each of Red, Green, and Blue are input. The input R, G, and B data are input to inversion means 1-1, 1-2, and 1-3, respectively, whereby the input data is subtracted from 255 to convert R, G, B to Cyan ($C_{in}$), Magenta ($M_{in}$), and Yellow ($Y_{in}$), respectively, which are complementary-color components.

The data converted to $C_{in}$, $M_{in}$, and $Y_{in}$ are input to color-space conversion means 2. In the color-space conversion means 2, outputs 1 to 4 are obtained by comparing the input $C_{in}$, $M_{in}$, and $Y_{in}$ data according to a predetermined relationship as shown in table of FIG. 5. Here, the outputs 1, 2, and 3 are each an 8-bit signal corresponding to the first color ($C_1$), the second color ($C_2$), and the brightness (L), respectively, and the output 4 is a 3-bit selection signal used to refer to, i.e. address, look-up table referring means 9.

FIG. 5 is a table showing the predetermined relationship between the inputs $C_{in}$, $M_{in}$, and $Y_{in}$, and the outputs 1 to 4.

First, when the inputs are such that $C_{in}==M_{in}==Y_{in}$, since the input data is formed of only the achromatic-color components, the outputs 1 and 2 become 0, and $C_{in}$ or $M_{in}$ or $Y_{in}$ is only output to the output 3. The output 4 at this time becomes (000).

Next, when the inputs are such that $Y_{in}>C_{in}$, $M_{in}<=Y_{in}$, and $C_{in}<=M_{in}$, since the hue of the input data is between Red and Yellow, Red components ($M_{in}-C_{in}$) are output as the output 1, Yellow components ($Y_{in}-M_{in}$) are output as the output 2, and achromatic-color components ($C_{in}$) are output as the output 3. The output 4 at this time becomes (001).

Similarly, according to the predetermined comparison relationship of $C_{in}$, $M_{in}$, and $Y_{in}$, seven types of conditions are possible (a combination such that $Y_{in}>C_{in}$, $M_{in}>Y_{in}$, and $C_{in}>M_{in}$ is not possible), and the output 1 to 4 are determined according to the respective conditions, as shown in FIG. 5.

Next, the output 1 ($C_1$) and the output 2 ($C_2$) of the color-space conversion means 2 are input to computation means 4-1 and 4-2, respectively. The computation means 4-1 and 4-2 calculate $C_1'$ and $C_2'$ on the basis of equation (3') obtained by modifying equation (3), respectively:

$$C_1'=C_1\times 255/(255-L)$$

$$C_2'=C_2\times 255/(255-L) \qquad (3')$$

The portion of $255/(255-L)$ is formed by inputting the output 3 (L) of the color-space conversion means 2 to the computation means 3.

Figure 9:
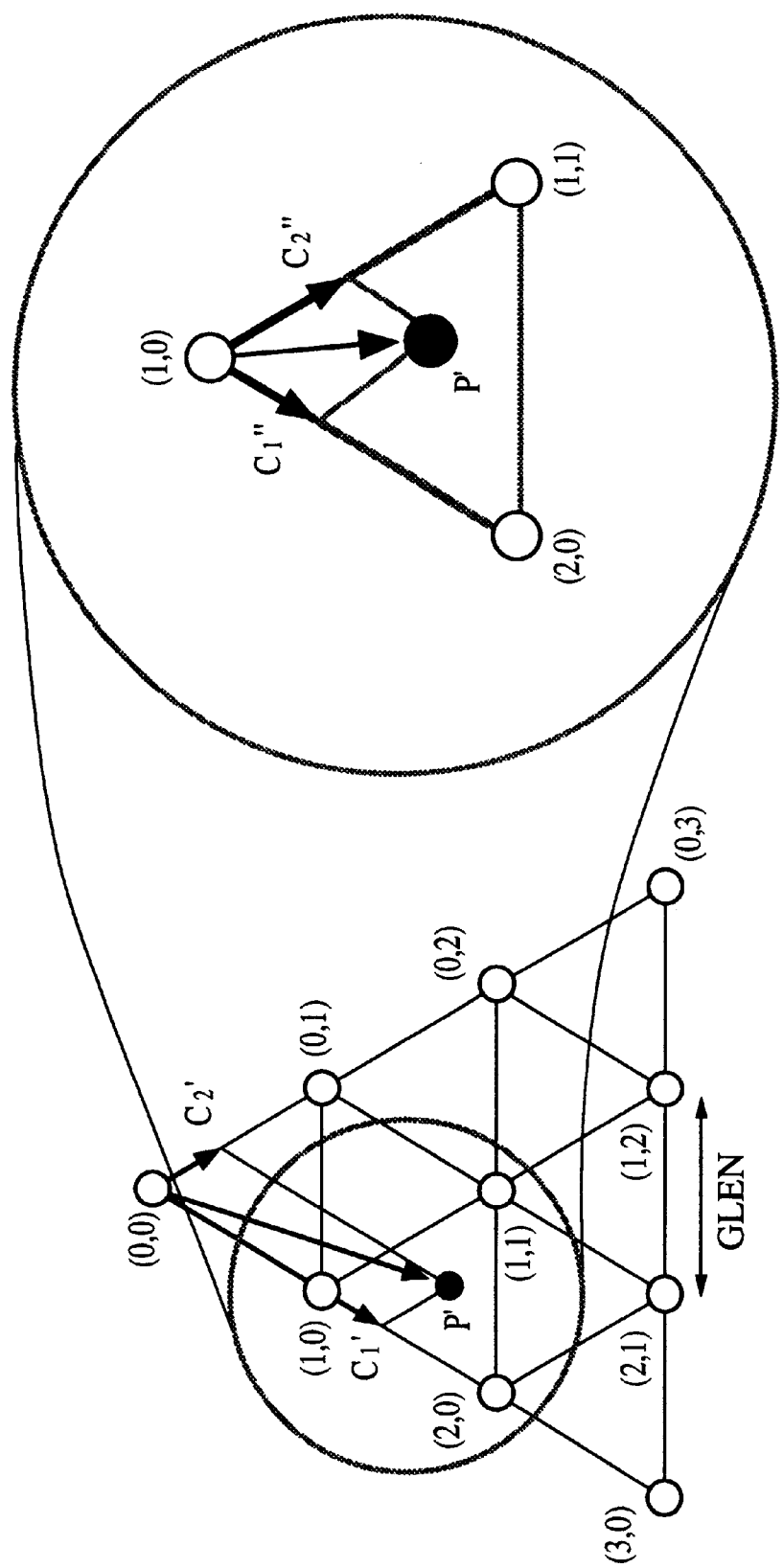
FIG. 9 is a view showing the meaning of the basic-point coordinates and an offset, and processing in calculation means 5-1 and 5-2 of FIG. 1A.

$C_1'$ and $C_2'$ obtained by the computation means 4-1 and 4-2 are input to calculation means 5-1 and 5-2 for calculating basic-point coordinates and an offset on the hexagon (FIG. 8) on the top surface, respectively. FIG. 9 shows the meanings of the basic-point coordinates and an offset, and processing in the calculation means 5-1 and 5-2.

First, on the left of FIG. 9, if the intersection of the straight line which connects the input color P to Black on the hexagon on the top surface is denoted as P', P' can be represented as the synthesis of $C_1'$ and $C_2'$, which are the outputs of the calculation means 5-1 and 5-2. Here, if it is assumed that P' is at a position such as on the left of FIG. 9, this is surrounded by the lattice points (1,0), (2,0), and (1,1). This part is enlarged on the right of FIG. 9. According to this figure, with (1,0) being the basic point, P' can be represented as the synthesis of offsets $C_1''$ and $C_2''$ from the basic point. At this time, if the coordinates of the basic point are called the basic-point coordinates and represented as (X,Y), the calculation means 5-1 inputs $C_1'$, and calculates the basic-point coordinate X corresponding to output 1 and an offset $C_1''$ from the basic point and outputs them. The calculation means 5-2 inputs $C_2'$, and calculates the basic-point coordinate Y corresponding to output 2 and an offset $C_2''$ from the basic point and outputs them. The processing at this time is shown by the following equation (5). If the basic coordinates corresponding to $C_1'$ and $C_2'$ are denoted as X and Y, respectively, and offsets are denoted as $C_1''$ and $C_2''$, respectively, the following are satisfied:

$$X=C_1'/GLEN$$

$$Y=C_2'/GLEN$$

$$C_1''=C_1' \% \, GLEN$$

$$C_2''=C_2' \% \, GLEN \qquad (5)$$

where GLEN indicates the distance between the lattice points on the hexagon on the top surface, and % indicates that the remainder is to be determined.

Figure 10:
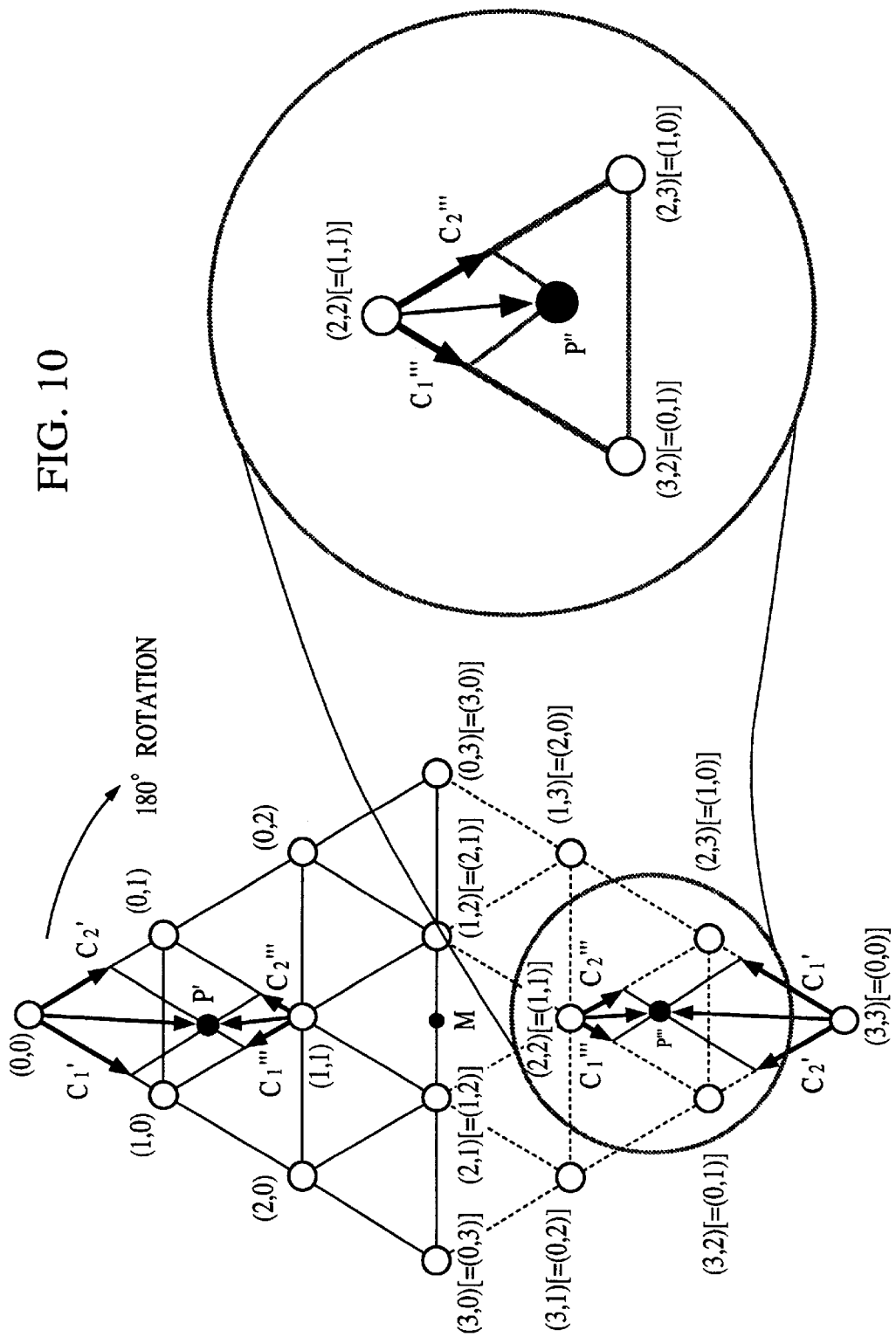
FIG. 10 is a view showing the basic-point coordinates and offset, which are different from those of FIG. 9.

At this point, if P' is at the position shown on the left in FIG. 10, this is surrounded by the lattice points (1,0), (0,1), and (1,1). In this case, unlike the example shown in FIG. 9, since the direction of the triangle which surrounds P' is reversed, the basic point and the offsets must be newly calculated. Therefore, as the triangle surrounded by the lattice points (0,0), (3,0), and (0,3), a triangle, which is rotated by 180° with the middle point M (shown by •) between the lattice points (3,0) and (0,3) as the center, P' is moved to P", and this is surrounded by the lattice points (2,2), (3,2), and (2,3). This part is enlarged on the right of FIG. 10. According to this figure, with (2,2) being the basic point, P" can be represented as the synthesis of offsets $C_1'''$ and $C_2'''$ from the basic point. At this time, if the basic-point coordinates are represented as (X', Y'), computation means 7-1 inputs X and $C_1''$ and outputs X' and $C_1'''$, and computation means 7-2 inputs Y and $C_2''$ and outputs Y' and $C_2'''$. Here, the relationship between the inputs X, Y, $C_1''$, and $C_2''$, and outputs X', Y', $C_1'''$, and $C_2'''$ is shown by equation (6):

$$X'=GMAX-X$$

$$Y'=GMAX-Y$$

$$C_1'''=GLEN-C_1''$$

$$C_2'''=GLEN-C_2'' \qquad (6)$$

where GMAX indicates the number of lattice points along each axis−1 (3 in this embodiment), and GLEN indicates the distance between the lattice points, as shown in FIG. 9.

Computation means 6 inputs the outputs $C_1''$ and $C_2''$ of the calculation means 5-1 and 5-2, and calculates:

$$C_1''+C_2''>GLEN \qquad (7)$$

If equation (7) is true, the computation means 6 outputs 1, and if it is not, outputs 0.

The outputs of the computation means 5-1 and 5-2 and the computation means 7-1 and 7-2 are input to selection means 8. The selection means 8 uses the output of the computation means 6 as a selection signal, and when the value is 0, selects the inputs from the calculation means 5-1 and 5-2, and when the value is 1, selects the inputs from the calculation means 7-1 and 7-2, and outputs $C_1''''$, $C_2''''$, X'''', and Y''''.

As described above, according to this embodiment, it is possible to easily determine at a high speed apexes (X and Y, or X' and Y') required to determine six lattice points corresponding to input data. In particular, since input data is mapped onto a hexagon by subtracting a minimum-value component from each of the three color components as shown in FIG. 5, it is possible to determine an apex with a simple process such as described above.

The outputs X" and Y" of the selection means 8 are input to the look-up table referring means 9. The look-up table referring means 9 is also a look-up table which is determined in advance so that the coordinates of specific three lattice points are output on the basis of the values of the outputs X" and Y"0 of the selection means 8, as shown in the table of FIG. 11. Since the hue is determined by inputting the output 4 of the color-space conversion means 2, the three lattice points $G_{00}$, $G_{10}$, and $G_{20}$ used to refer to a look-up table 10 such as shown in FIG. 8 are determined and output.

Shown in FIG. 10 is a look-up table (LUT) formed by a RAM (random access memory) or a ROM (read only memory), which is structured as shown in FIG. 6 in this embodiment. By providing as the inputs of the look-up table 10 the outputs $G_{00}$, $G_{10}$, and $G_{20}$ of the look-up table referring means 9 and the output 3 (L) of the color-space conversion means 2, the six lattice points $G_{0i}$, $G_{1i}$, $G_{2i}$, $G_{0i+1}$, $G_{1i+1}$, and $G_{2i+1}$, shown in FIG. 8, are determined, and output are the output values $C_{0i}$, $C_{1i}$, $C_{2i}$, $C_{0i+1}$, $C_{1i+1}$, $C_{2i+1}$, $M_{0i}$, $M_{1i}$, $M_{2i}$, $M_{0i+1}$, $M_{1i+1}$, $M_{2i+1}$, $Y_{0i}$, $Y_{1i}$, $Y_{2i}$, $Y_{0i+1}$, $Y_{1i+1}$, $Y_{2i+1}$, $K_{0i}$, $K_{1i}$, $K_{2i}$, $K_{0i+1}$, $K_{1i+1}$, and $K_{2i+1}$ corresponding to each color (four colors of CMYK in this embodiment) provided to these six lattice points in advance.

These output values and the output 3 (L) of the color-space conversion means 2 are input to first interpolation computation means 11-1 to 11-4 for each color, interpolation-computed by equations such that O of equation (1) is substituted into each of the colors C, M, Y, and K, and formed into $C_{0L}$, $C_{1L}$, $C_{2L}$, $M_{0L}$, $M_{1L}$, $M_{2L}$, $Y_{0L}$, $Y_{1L}$, $Y_{2L}$, $K_{0L}$, $K_{1L}$, and $K_{2L}$, and output, respectively.

Furthermore, these output values and the outputs $C_1''''$ and $C_2''''$ of the selection means 8 are input to second first interpolation computation means 12-1 to 12-4 for each color, interpolation-computed by equations such that O of equation (4) is substituted into each color of C, M, Y, and K, and formed into C, M, Y, and K, and output, respectively.

As a result of the above, with respect to an input of R, G, and B data, each of which is 8 bits, C, M, Y, and K data, each of which is 8 bits, are output by an interpolation computation process.

As has been described up to this point, according to this embodiment, it is possible to easily generate a brightness component L and color components $C_1$ and $C_2$ according to the table of FIG. 5 and equation (3).

Also, since color-component data (C, M, Y, and K) dependent upon a device is generated using a hexagonal pyramid such as that shown in FIG. 3, it is possible to perform color adjustment of the gradation of brightness, to which the human eye is most visually sensitive, independent of the other components. That is, it is possible to finely and continuously control the relationship between K, and C, M, and Y while compensating for the reproducibility of an achromatic color.

Also, since the color cube is a hexagonal pyramid, it is possible to perform interpolation processing by using six points along the brightness component. Since, as described above, color adjustment and interpolation processing are performed by placing importance on brightness, it is possible to realize color reproducibility with high accuracy regarding brightness. Furthermore, since interpolation processing is performed on the basis of six points, it is possible to perform interpolation processing at a higher speed than that of conventional interpolation processing based on eight points.

[Second Embodiment]

Figure 12B:
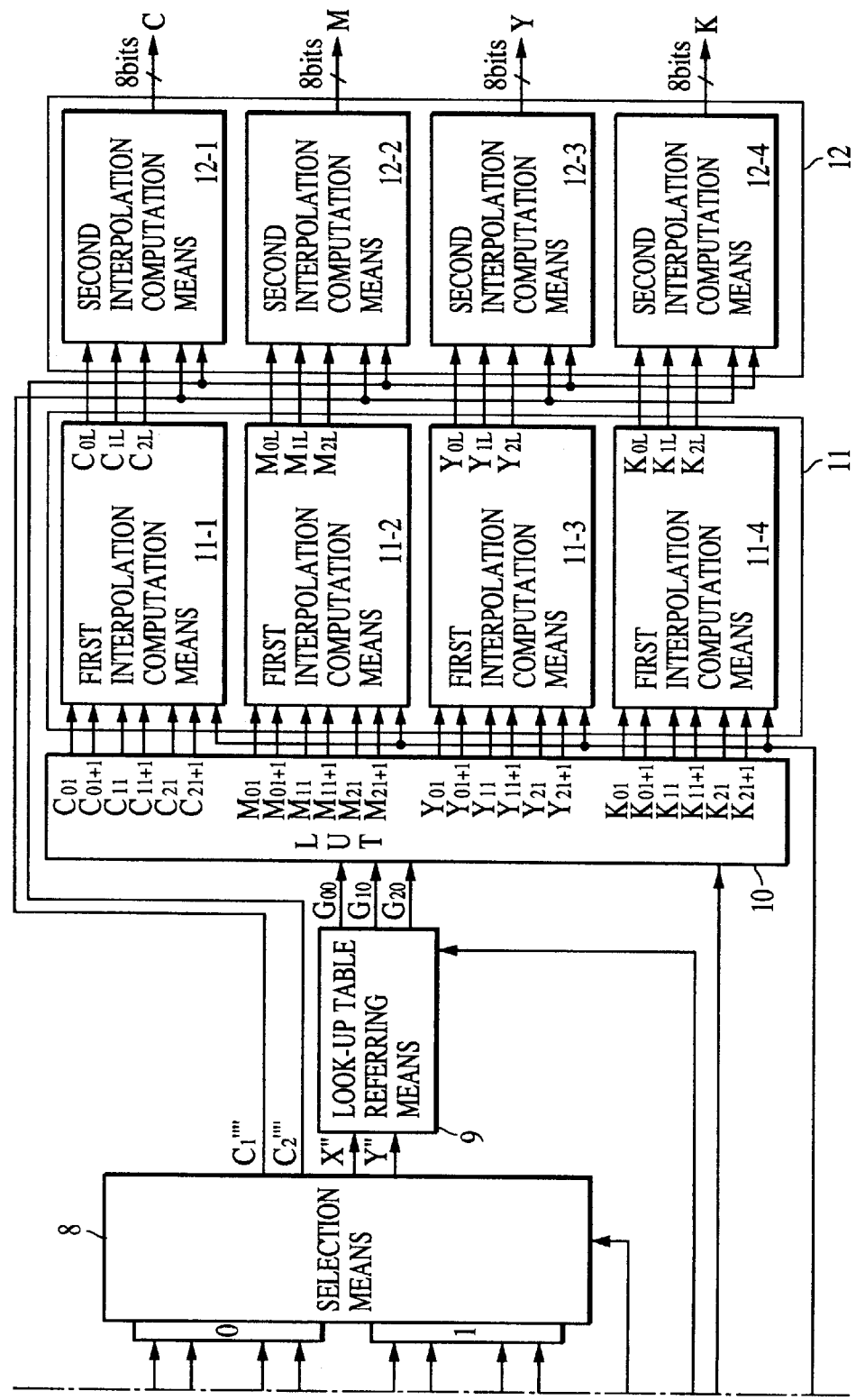

FIGS. 12A and 12B when taken together as shown in FIG. 12 is a block diagram illustrating the construction of an image processing apparatus for performing CMY-CMYK conversion according to a second embodiment of the present invention.

Figure 13:
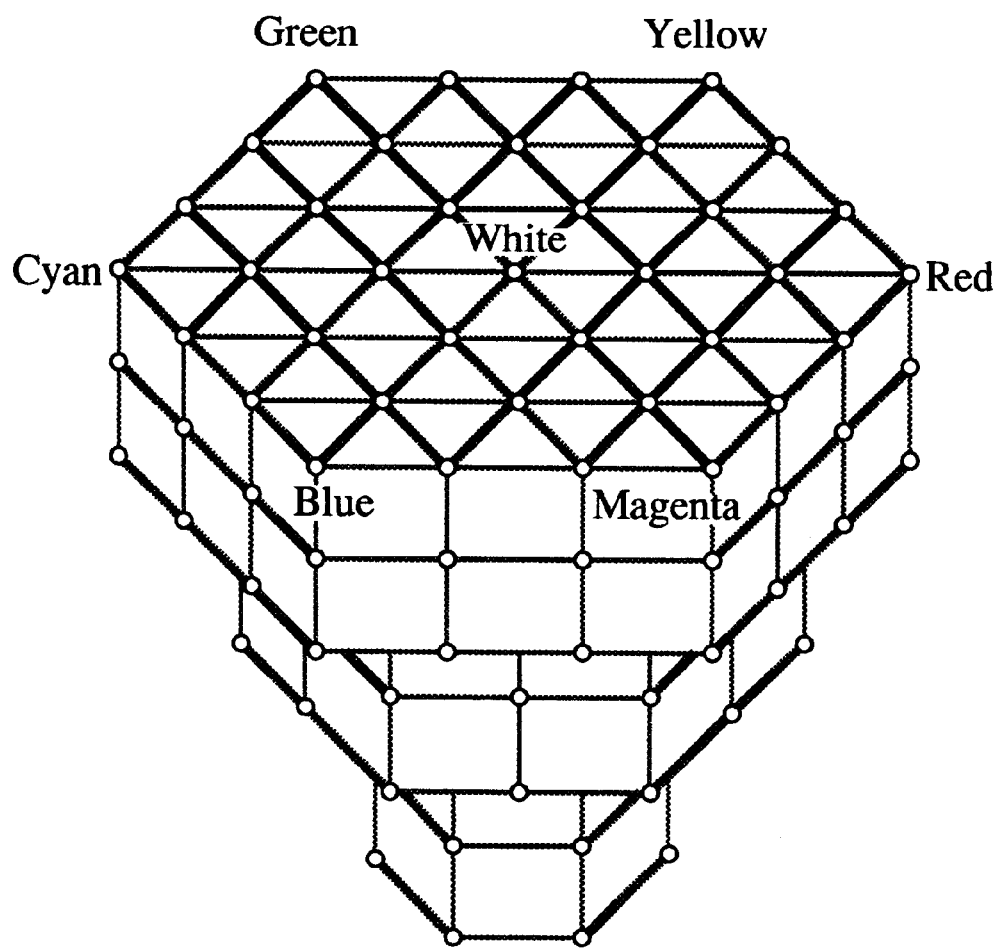
FIG. 13 is a first schematic view showing the structure of a LUT according to the second embodiment of the present invention.
Figure 14:
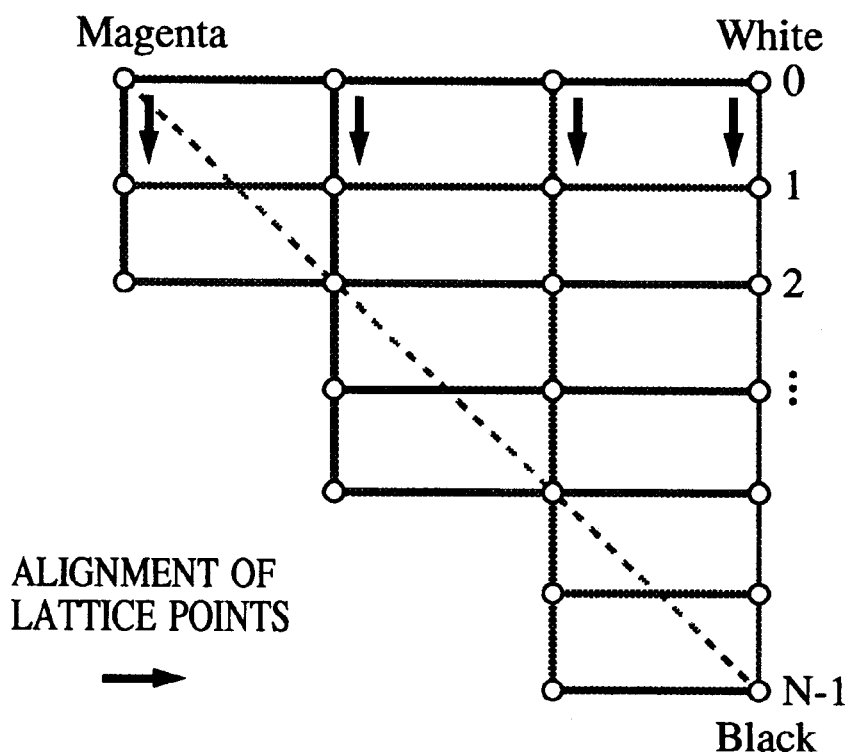
FIG. 14 is a second schematic view showing the structure of a LUT according to the second embodiment of the present invention.

In the first embodiment, a LUT is structured in a form such as that shown in FIGS. 6 and 7. However, in this embodiment, a LUT is structured in a form such as that shown in FIGS. 13 and 14. That is, six lattice points required for interpolation are arranged at each apex of a triangular prism, such triangular prisms are stacked one on another as shown in FIGS. 13 and 14, and a cube such as that containing a hexagonal pyramid shown in the embodiment is constructed. With such a construction, the size of the LUT can be reduced approximately to ⅓ that of the first embodiment.

In this embodiment, since the six lattice points required for interpolation are arranged at each apex of a triangular prism, even if interpolation is not performed such that the intersection of the straight line which connects the input point on the hexagon of the top surface to Black is determined and $C_1'$ and $C_2'$ are determined on the basis of the position of that point as described in FIG. 8 in the first embodiment, it is possible for calculation means 5-1 and 5-2 to directly determine $C_1''$ and $C_2''$ on the basis of the output 1 ($C_1$) and the output 2 ($C_2$) of the color-space conversion means 2.

For this purpose, instead of equation (5), the following may be used:

$$X = C_1/\text{GLEN}$$

$$Y = C_2/\text{GLEN}$$

$$C_1'' = C_1\% \text{ GLEN}$$

$$C_2'' = C_2\% \text{ GLEN} \tag{4'}$$

Therefore, it is possible to omit the computation means 3 and the computation means 4-1 and 4-2 shown in the first embodiment.

With such a construction, with respect to the input of 8-bit data of each of R, G, and B, 8-bit data of each of C, M, Y, and K is output by an interpolation computation process.

[Another embodiment]

Although the number of bits of input/output data per channel is eight in the above-described embodiments, the number of bits is not limited to this number.

Also, although the input signals are Red, Green, and Blue, it is a matter of course that data formed of other color components, such as Cyan, Magenta, and Yellow, can be input signals without passing them through the inversion means 1-1, 1-2, and 1-3.

Also, although the number of output channels is four, in the present invention, the number of output channels is not limited to four. By providing a LUT and first and second interpolation computation means corresponding to the number of output channels, it is possible to serve any number of output channels.

For example, outputs of six channels may be provided so that they correspond to light ink and dark ink of each of Cyan and Magenta, Yellow, and Black. In this case, six-color-component data is stored at each lattice point of a LUT of a hexagonal pyramid so that this serves the output channels. When the above-described embodiment is applied to six-channel data, it is possible to control a change from light ink to dark ink and implant-amount control with high accuracy, and to easily realize color reproducibility with high quality.

Also, although a case is described in which the number of lattice points in a direction from White to each apex of Cyan, Magenta, Yellow, Red, Green, and Blue is four, this number is not limited to four. Since the distance (GLEN) between the lattice points is determined by the number (GMAX) of lattice points in the above-described direction, equation (4) or (4'), and (5) are generalized regardless of the number of lattice points. Therefore, the number of lattice points in the above-described direction are freely selected according to the required interpolation accuracy.

Also, although a case is described in which the number of lattice points in a brightness direction is seven, this can also be freely selected according to the required interpolation accuracy.

Furthermore, although the above-described embodiments describe the realization of a method by using hardware such as that shown in FIGS. 1 and 12, it may also be realized by using software. In this case, the CPU performs a process corresponding to each means on input data in accordance with a program which realizes each means in FIGS. 1 and 12, which is stored in advance so as to correspond to the address of the LUT, which is stored in a RAM or a ROM, and performs an interpolation process in accordance with a program, thus a process equivalent to the above-described embodiment is realized by software.

An embodiment in which the program is supplied to a computer inside an apparatus or system, and the computer (CPU or MPU) of the system or the apparatus causes the above-described various devices to operate in accordance with the stored program is included in the scope of the present invention.

In this case, the program itself of the above-described software realizes the functions of the above-described embodiment. The program itself, and means for supplying the program to a computer, for example, a storage medium in which codes of such a program are stored, constitute the present invention.

As such storage media for storing programs, for example, floppy disks, hard disks, optical disks, optomagnetic disks, CD-ROMs, magnetic tape, non-volatile memory cards, ROMs, and the like may be used.

Not only in the case where the functions of the above-described embodiment are realized by executing a supplied program by a computer, but also in the case where the program collaborates with an operating system (OS), another application software, and the like in a computer so that the functions of the above-described embodiment are realized, it is a matter of course that such program is included in the embodiment of the present invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing method, comprising the steps of:
   inputting a signal composed of three color components;
   converting the input signal into first and second color components and a component indicating brightness;
   referring to a look-up table on a basis of the first and second color components and the component indicating brightness, and reading six pieces of output device dependent color-component data; and
   performing interpolation processing on a basis of the read six pieces of output device dependent color-component data, and generating output device dependent color-component data corresponding to the input signal.

2. An image processing method according to claim 1, wherein the input signal is converted into the first and second color components and the component indicating brightness on a basis of a predetermined comparison relationship of the color components which compose the input signal.

3. An image processing method according to claim 1, wherein a structure of data stored look-up table is in a form of a hexagonal pyramid.

4. An image processing method according to claim 1, wherein the plurality of output device dependent color components are cyan, magenta, yellow, and black.

5. An image processing method according to claim 1, wherein the plurality of output device dependent color components include dark cyan and light cyan.

6. An image processing method, comprising the steps of:
   inputting a signal composed of three color components;
   generating a brightness component, and two color components on a basis of minimum data of the three components;
   referring to a look-up table on a basis of the first and second color components and the component indicating brightness, and reading six pieces of output device dependent color-component data; and
   performing interpolation processing on a basis of the read six pieces of output device dependent color-component data, and generating output device dependent color-component data corresponding to the input signal;
   wherein:
   a structure of data stored in the look-up table is in a form of a hexagonal pyramid.

7. An image processing apparatus comprising:
   means for inputting a signal composed of three color components;
   means for converting the input signal into first and second color components and a component indicating brightness;
   means for referring to a look-up table on a basis of the first and second color components and the component indicating brightness, and reading six pieces of output device dependent color-component data; and
   means for performing interpolation processing on a basis of the read six pieces of output device dependent color-component data, and generating output device dependent color-component data corresponding to the input signal.

8. An image processing apparatus comprising:
   means for inputting a signal composed of three color components;
   means for generating a brightness component, and two color components on a basis of minimum data of the three components;
   means for referring to a look-up table on a basis of the first and second color components and the component indicating brightness, and reading six pieces of output device dependent color-component data; and
   means for performing interpolation processing on a basis of the read six pieces of output device dependent color-component data, and generating output device dependent color-component data corresponding to the input signal;
   wherein:
   a structure of data stored in the look-up table is in a form of hexagonal pyramid.

9. A computer-readable recording medium storing a computer readable program for controlling an image processing operation, which upon execution causes performance of the steps of:
   inputting a signal composed of three color components;
   converting the input signal into first and second color components and a component indicating brightness;
   referring to a look-up table on a basis of the first and second color components and the component indicating brightness, and reading six pieces of output device dependent color-component data; and
   performing interpolation processing on a basis of the read six pieces of output device dependent color-component data, and generating output device dependent color-component data corresponding to the input signal.

10. A computer-readable recording medium storing a program for controlling an image processing operation, which upon execution causes performance of the steps of:

inputting a signal composed of three color components;

generating a brightness component, and two color components on a basis of minimum data of the three components;

referring to a look-up table on a basis of the first and second color components and the component indicating brightness, and reading six pieces of output device dependent color-component data; and performing interpolation processing on a basis of the read six pieces of output device dependent color-component data, and generating output device dependent color-component data corresponding to the input signal;

wherein a structure of data stored in the look-up table is in a form of a hexagonal pyramid.

* * * * *

UNITED STATES PATENT AND TRADEMARK OFFICE
CERTIFICATE OF CORRECTION

PATENT NO.    : 6,307,644 B1
DATED         : October 23, 2001
INVENTOR(S)   : Takatoshi Ohta It is certified that error appears in the above-identified patent and that said Letters Patent is hereby corrected as shown below:

Title page,
Item [56], FOREIGN PATENT DOCUMENTS,
"0551773    1/1986  (EP)" should be deleted;
"5046750    2/1993  (JP)" should read -- 5-046750    2/1993  (JP) --;
"7193723    7/1995  (JP)" should read -- 7-193723    7/1995  (JP) --; and
"8237497    9/1996  (JP)" should read -- 8-237497    9/1996  (JP) --.

Column 1,
Line 23, "Internationaldel" should read -- International del --; and
Line 29, "that" should read -- as --.

Column 6,
Line 43, "Y"0" should read -- Y" --.

Signed and Sealed this

Eighteenth Day of June, 2002

Attest:

JAMES E. ROGAN
Attesting Officer          Director of the United States Patent and Trademark Office